United States Patent
Im

(10) Patent No.: US 11,938,886 B2
(45) Date of Patent: Mar. 26, 2024

(54) CURTAIN AIRBAG APPARATUS FOR VEHICLE

(71) Applicant: HYUNDAI MOBIS CO., LTD., Seoul (KR)

(72) Inventor: Ji Hyuk Im, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/062,546

(22) Filed: Dec. 6, 2022

(65) Prior Publication Data
US 2023/0311805 A1    Oct. 5, 2023

(30) Foreign Application Priority Data
Apr. 4, 2022    (KR) .......................... 10-2022-0041781

(51) Int. Cl.
B60R 21/232    (2011.01)
(52) U.S. Cl.
CPC .................................. B60R 21/232 (2013.01)
(58) Field of Classification Search
CPC .......................... B60R 21/232; B60R 21/23138
See application file for complete search history.

(56) References Cited

U.S. PATENT DOCUMENTS

| | | | | |
|---|---|---|---|---|
| 6,705,640 B2 * | 3/2004 | Takahashi | ............. | B60R 21/232 280/730.2 |
| 8,091,918 B2 * | 1/2012 | Mitchell | ............... | B60R 21/201 280/730.2 |
| 2006/0192368 A1 * | 8/2006 | Hall | ....................... | B60R 21/213 280/730.2 |
| 2015/0191141 A1 * | 7/2015 | Wang | .................... | B60R 21/216 280/730.2 |
| 2021/0031719 A1 * | 2/2021 | Montgomery | ........ | B60R 21/232 |
| 2021/0114545 A1 * | 4/2021 | Moran | .................. | B60R 21/232 |

FOREIGN PATENT DOCUMENTS

KR    2012-0092240    8/2012

OTHER PUBLICATIONS

English Language Abstract of KR 2012-0092240 published Aug. 21, 2012.

* cited by examiner

*Primary Examiner* — Drew J Brown
*Assistant Examiner* — Matthew Joseph Ganci
(74) *Attorney, Agent, or Firm* — DLA Piper LLP (US)

(57) ABSTRACT

A curtain airbag apparatus for a vehicle, the curtain airbag apparatus including a mounting tab folded in an upward/downward direction so that portions of the mounting tab overlap one another, and having a decreased vertical length in an assembled state, a cushion folded in the assembled state and configured to move downward while inflated when deployed, and a tab strap having one end coupled to the mounting tab and the other end fixed to the mounting tab in a state in which the tab strap surrounds the cushions, in which when the cushion is deployed, a folded portion of the mounting tab is unfolded, such that the mounting tab is extended, and a position of the cushion is moved downward.

10 Claims, 4 Drawing Sheets

CURTAIN AIRBAG APPARATUS FOR VEHICLE

CROSS REFERENCE TO RELATED APPLICATION

The present application claims priority of Korean Patent Application No. 10-2022-0041781 filed on Apr. 4, 2022, the entire contents of which is incorporated herein for all purposes by this reference.

TECHNICAL FIELD

The present disclosure relates to a curtain airbag apparatus for a vehicle, and more particularly, to a curtain airbag apparatus for a vehicle, in which a mounting tab configured to fix a cushion to a vehicle body is extended downward at the time of deployment of the cushion, which makes it possible to efficiently use an area of the cushion.

BACKGROUND

A curtain airbag apparatus installed in a vehicle body serves to protect an occupant from impact applied from the outside because of a vehicle collision. The curtain airbag apparatus is deployed between the occupant and a window of the vehicle to prevent the occupant from colliding directly with a lateral surface of the vehicle or prevent the occupant from being injured by debris caused by a broken window of the vehicle.

However, in the case of a curtain airbag apparatus in the related art, an upper end of a cushion coupled to a vehicle body is moved downward and positioned by a length of a mounting tab when the cushion is deployed. In this case, the upper end of the cushion remains as a region unnecessary to protect the occupant because the upper end of the cushion is positioned to be higher than a height required to protect the occupant. Further, there is a problem in that an inflator also has an unnecessary capacity.

The occurrence of the unnecessary region of the cushion causes a problem in that an area of the cushion cannot be efficiently used, which causes a problem in that costs of the cushion increase, and the capacity of the inflator increases.

The foregoing explained as the background is intended merely to aid in the understanding of the background of the present disclosure, and is not intended to mean that the present disclosure falls within the purview of the related art that is already known to those skilled in the art.

SUMMARY DISCLOSURE

Accordingly, the present disclosure has been made keeping in mind the above problems occurring in the related art, and the present disclosure is intended to increase downward a length of a mounting tab, which is installed to have a decreased length of a general mounting tab in the related art, in case of deployment of a cushion, such that the cushion is moved downward and deployed at an optimal position for protecting an occupant, which makes it possible to efficiently use an area of the cushion.

According to one aspect, there is provided a curtain airbag apparatus for a vehicle, the curtain airbag apparatus including: a mounting tab having an upper end coupled to a vehicle body and extending downward, the mounting tab being folded in an upward/downward direction so that portions of the mounting tab overlap one another, and having a decreased vertical length in an assembled state; a cushion folded in the assembled state and coupled to a lower end of the mounting tab, the cushion being configured to move downward while inflated when deployed; and a tab strap extending to surround the folded cushion and having one end coupled to the mounting tab and the other end fixed to the mounting tab, in which when the cushion is deployed, a folded portion of the mounting tab is unfolded, such that the mounting tab is extended, and a position of the cushion is moved downward.

A central portion of the mounting tab in the assembled state may be temporarily fixed so that the mounting tab is fixed in the state in which the mounting tab is folded so that the portions of the mounting tab overlap one another, and when the cushion is deployed, the temporarily fixed portion may be fractured, and the folded portion may be unfolded.

The mounting tab may have at least one unit shape that is folded upward once and downward once.

The mounting tab may have a fixing hole formed through the upper end thereof, and the mounting tab may be mounted on the vehicle body through the fixing hole.

When the cushion is deployed, an upper end of the cushion may be positioned above a headrest of a seat of the vehicle, and a lower end of the cushion may be positioned below the headrest of the seat of the vehicle.

One end of the tab strap may be coupled to a lower end of the mounting tab, and the other end of the tab strap may be fixed to an upper end of the mounting tab in a state in which the tab strap surrounds the folded cushion.

A cut-out region may be formed at one end of the tab strap, and the mounting tab may penetrate the cut-out region, such that one end of the tab strap is fixed to the mounting tab in a state in which the tab strap surrounds the folded cushion.

The mounting tab may have a protrusion formed on a portion that adjoins the cut-out region of the tab strap, and one end of the tab strap may be fixed to the mounting tab as the cut-out region is caught by the protrusion.

The cut-out region formed at one end of the tab strap may be fractured when the cushion is deployed so that the cushion, which is folded and surrounded by the tab strap, moves downward while inflated when deployed.

The mounting tab and the tab strap may constitute a fixing set, and a plurality of fixing sets may be disposed on the upper end of the cushion and spaced apart from one another.

The mounting tab, the cushion, and the tab strap may be coupled at once in a state in which portions of the mounting tab, which are respectively connected to the cushion and the tab strap, are aligned on the same line.

A lower end of the mounting tab, an upper end of the cushion, and one end of the tab strap may be coupled together at the same point.

According to the airbag apparatus for a vehicle according to the present disclosure, the length of the mounting tab is increased when the cushion is deployed, and the cushion is positioned downward to the extent that the length of the mounting tab is increased. Therefore, in comparison with the curtain airbag for a vehicle in the related art, the upper end of the cushion is positioned away from the upper end of the vehicle body and close to the occupant's head. Therefore, it is possible to reduce a region that is positioned at the upper end of the vehicle body and does not protect the occupant.

Therefore, a wider region for protecting the occupant may be ensured when the cushion is mounted while maintaining an area in the related art. Further, an area required to protect the occupant may be ensured even though the area is reduced in comparison with the related art. Therefore, it is possible to reduce the costs of the cushion and also reduce the capacity of the inflator required to deploy the cushion because the area of the cushion is reduced.

The effects obtained by the present disclosure are not limited to the aforementioned effects, and other effects, which are not mentioned above, will be clearly understood by those skilled in the art from the following description.

DETAILED DESCRIPTION OF THE DISCLOSURE

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application. Hereinafter, embodiments of the present disclosure will be described in detail with reference to the accompanying drawings.

Figure 1:
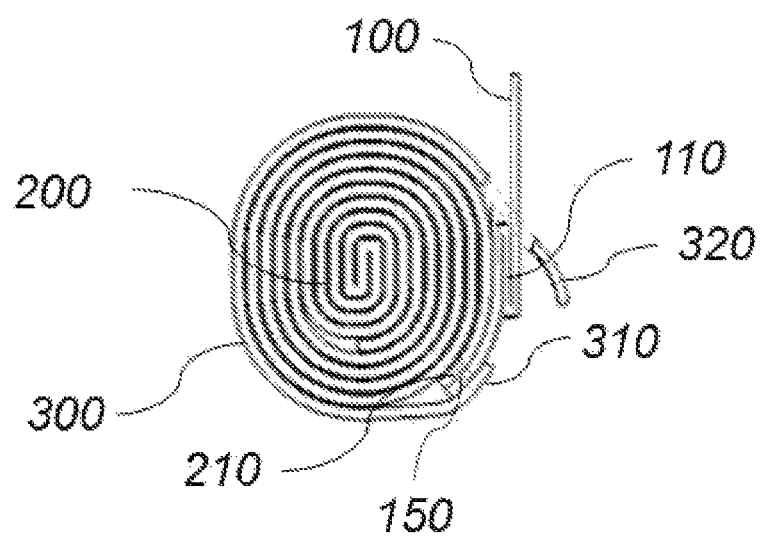
FIG. 1 is a view illustrating an assembled state of a curtain airbag apparatus for a vehicle according to an embodiment of the present disclosure when viewed from the lateral side.
Figure 2:
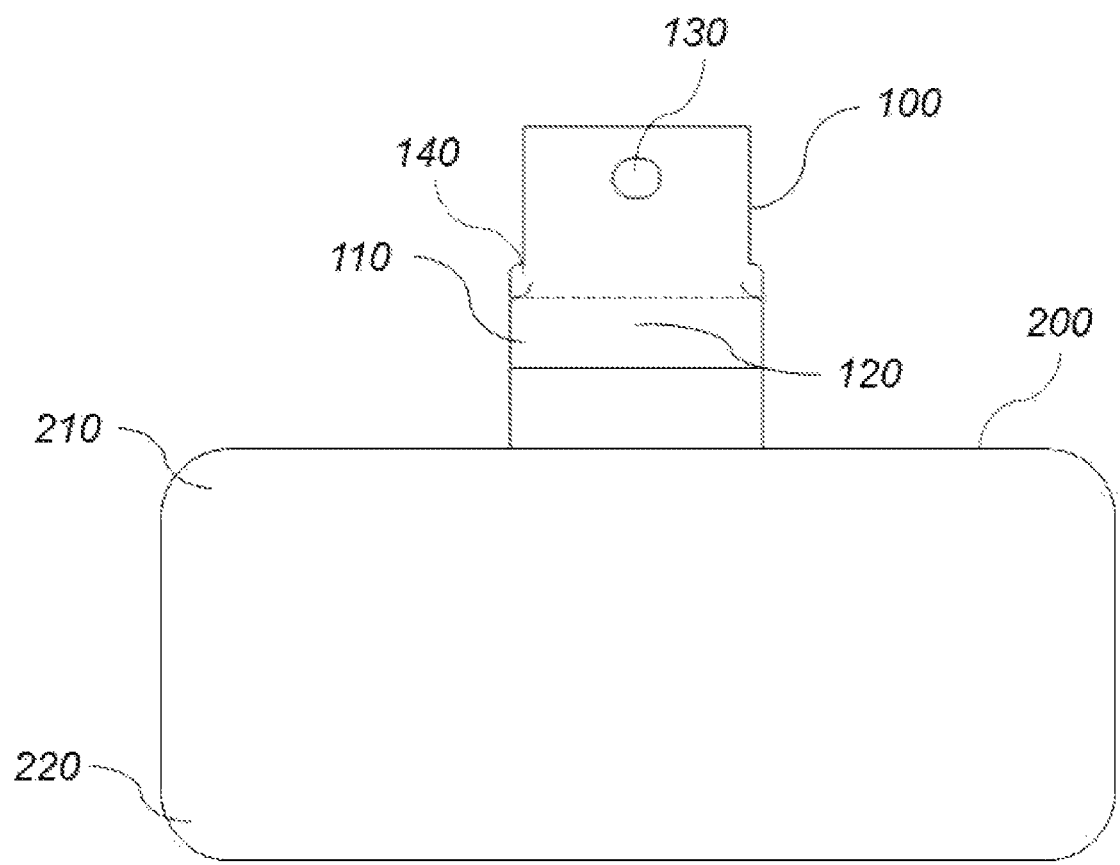
FIG. 2 is a view illustrating a state in which a length of a mounting tab is decreased as the mounting tab is folded in the curtain airbag apparatus for a vehicle according to the embodiment of the present disclosure.
Figure 3:
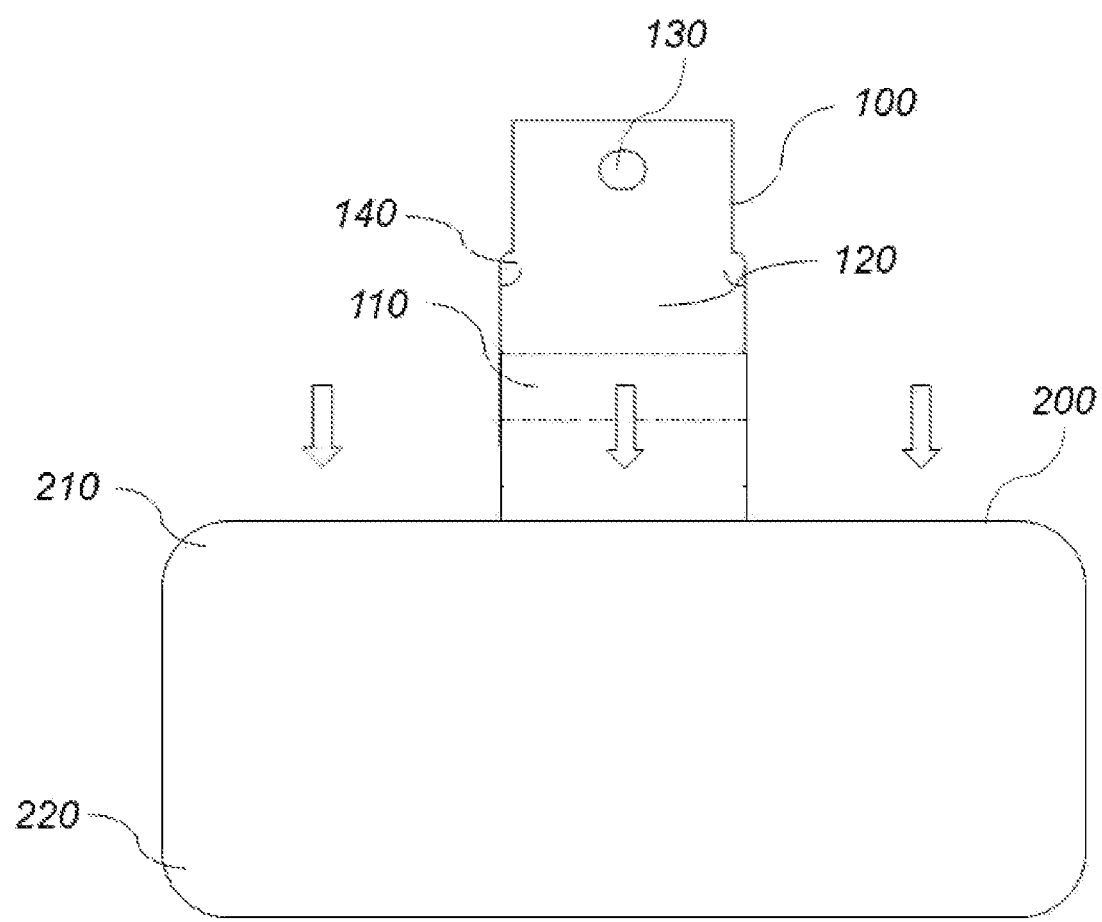
FIG. 3 is a view illustrating a state in which the length of the mounting tab is increased as the mounting tab is unfolded in the curtain airbag apparatus for a vehicle according to the embodiment of the present disclosure.
Figure 4:
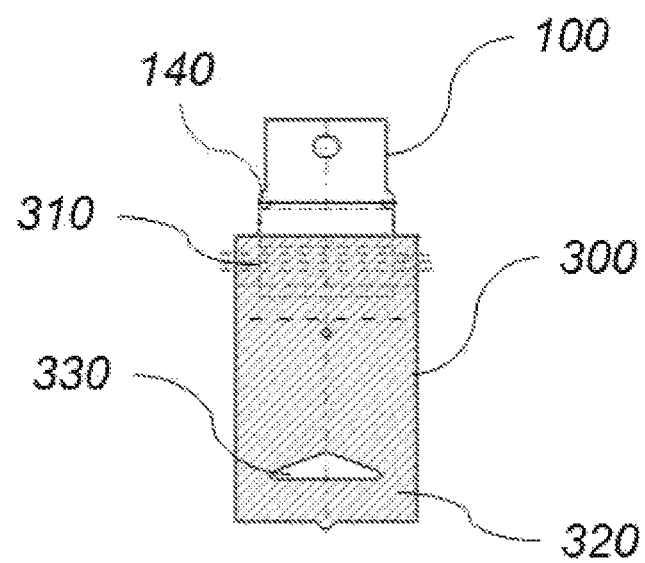
FIG. 4 is a view illustrating a tab strap coupled to the mounting tab in the curtain airbag apparatus for a vehicle according to the embodiment of the present disclosure.
Figure 5:
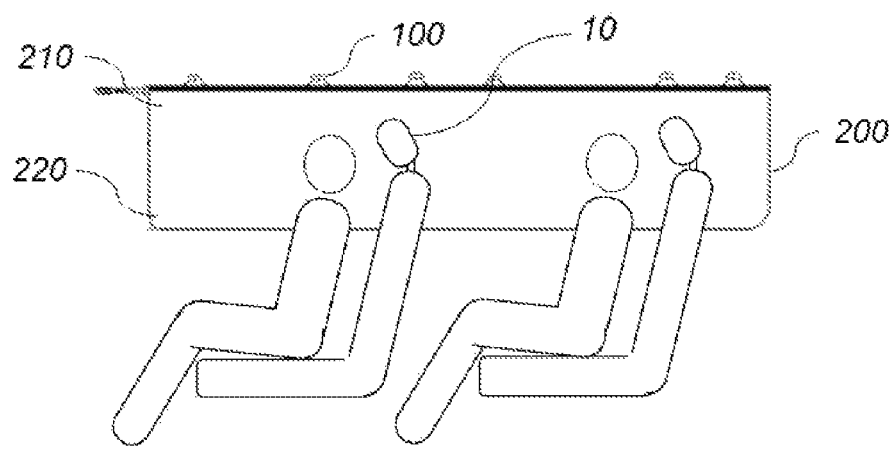
FIG. 5 is a view illustrating a state in which a cushion of the curtain airbag apparatus for a vehicle according to the embodiment of the present disclosure is deployed.

FIG. 1 is a view illustrating an assembled state of a curtain airbag apparatus for a vehicle according to an embodiment of the present disclosure when viewed from the lateral side, FIG. 2 is a view illustrating a state in which a length of a mounting tab is decreased as the mounting tab is folded in the curtain airbag apparatus for a vehicle according to the embodiment of the present disclosure, FIG. 3 is a view illustrating a state in which the length of the mounting tab is increased as the mounting tab is unfolded in the curtain airbag apparatus for a vehicle according to the embodiment of the present disclosure, FIG. 4 is a view illustrating a tab strap coupled to the mounting tab in the curtain airbag apparatus for a vehicle according to the embodiment of the present disclosure, and FIG. 5 is a view illustrating a state in which a cushion of the curtain airbag apparatus for a vehicle according to the embodiment of the present disclosure is deployed.

FIG. 1 is a view illustrating an assembled state of a curtain airbag apparatus for a vehicle according to an embodiment of the present disclosure when viewed from the lateral side. A curtain airbag apparatus for a vehicle according to the present disclosure includes: a mounting tab having an upper end coupled to a vehicle body and extending downward, the mounting tab being folded in an upward/downward direction so that portions of the mounting tab overlap one another, and having a decreased vertical length thereof in an assembled state; a cushion folded in the assembled state and coupled to a lower end of the mounting tab, the cushion being configured to move downward while inflated when deployed; and a tab strap extending to surround the folded cushion and having one end coupled to the mounting tab and the other end fixed to the mounting tab, in which when the cushion is deployed, a folded portion of the mounting tab is unfolded, such that the mounting tab is extended, and a position of the cushion is moved downward.

The curtain airbag apparatus for a vehicle according to the present disclosure is installed at an upper end of a lateral surface of a vehicle body by means of a mounting tab 100 in an assembled state in which the mounting tab 100, a cushion 200, and a tab strap 300 are coupled, and the tab strap 300 surrounds the folded cushion 200.

When impact from the outside is detected, gas is discharged from an inflator of the curtain airbag apparatus for a vehicle, the cushion 200 connected to the inflator is inflated, and the tab strap 300 surrounding the folded cushion 200 is loosened, such that the cushion 200 is deployed downward. Thereafter, the deployed cushion 300 is positioned between a window and a seat of the vehicle and serves to mitigate impact to be applied to the occupant because of a vehicle collision.

In the curtain airbag apparatus for a vehicle according to the present disclosure, the mounting tab 100 is assembled in a state in which a length of the mounting tab 100 is decreased as the mounting tab 100 is folded in an upward/downward direction so that portions of the mounting tab 100 overlap one another. When the cushion 200 is deployed, a folded portion 110 is unfolded, and the length of the mounting tab 100 is increased to a degree to which the portions of the mounting tab 100 overlap one another. The length of the mounting tab 100 in the folded state is equal to a length of a general mounting tab in the related art, and thus the mounting tab 100 may have compatibility. The length of the mounting tab 100 in the unfolded state is longer than the length of the general mounting tab in the related art, such that an upper end of the cushion 200 may be positioned closer to the occupant's head as the upper end of the cushion 200 is moved downward.

An area of the cushion 200, which is positioned at the upper end of the vehicle body in the state in which the cushion 200 is deployed, remains as a region unnecessary to protect the occupant. However, because the cushion 200 is moved downward and positioned to be closer to the occupant's head, it is possible to reduce the region unnecessary to protect the occupant.

Meanwhile, in the case of the curtain airbag apparatus for a vehicle according to the present disclosure, the mounting tab, the cushion, and the tab strap may be coupled at once in a state in which the portions of the mounting tab 100, which are respectively connected to the cushion 200 and the tab strap 300, are aligned on the same line.

The coupling between the mounting tab 100 and the cushion 200 enables the cushion 200 to be kept fixed to the vehicle body and positioned in position even though the cushion 200 is rapidly inflated and deployed. Therefore, the mounting tab 100 and the cushion 200 may be securely coupled. In addition, the coupling between the mounting tab 100 and the tab strap 300 is moved downward so as not to interrupt the use of the vehicle when the cushion 200 folded in the assembled state is not deployed.

The coupling between the mounting tab and the cushion and the coupling between the mounting tab and the tab strap may be separately performed. However, the mounting tab, the cushion, and the tab strap may be coupled at once in a state in which the mounting tab, the cushion, and the tab strap are aligned on the same line. Because the mounting tab 100, the cushion 200, and the tab strap 300 are coupled at once as described above, the process may be simplified, and the production costs may be reduced.

Specifically, a point at which the mounting tab 100, the cushion 200, and the tab strap 300 are coupled may be a point at which a lower end 150 of the mounting tab, an upper end 210 of the cushion, and one end 310 of the tab strap are aligned on the same line. Because the cushion 200 and the tab strap 300 are coupled to the lower end 150 of the mounting tab, the cushion 200 may further move downward in comparison with the case in which the cushion 200 and the tab strap 300 are coupled to the upper end of the mounting tab.

FIG. 2 is a view illustrating a state in which the length of the mounting tab 100 is decreased as the mounting tab 100 is folded in the curtain airbag apparatus for a vehicle according to the embodiment of the present disclosure and illustrating a state in which the cushion 200 is coupled to the mounting tab 100 with the decreased length.

FIG. 3 is a view illustrating a state in which the length of the mounting tab 100 is increased as the mounting tab 100 is unfolded in the curtain airbag apparatus for a vehicle according to the embodiment of the present disclosure and illustrating a state in which the folded portion 110 of the mounting tab is unfolded, and the position of the cushion 200 is moved downward to the extent corresponding to the overlapping portions of the mounting tab 100.

Referring to FIGS. 2 and 3, in the curtain airbag apparatus for a vehicle according to the present disclosure, the vertical length of the mounting tab 100 in the assembled state is decreased as the mounting tab 100 is folded in the upward/downward direction so that the portions of the mounting tab 100 overlap one another. When the cushion 200 is deployed, the folded portion 110 is unfolded, such that the mounting tab 100 is extended, and the position of the cushion 200 is moved downward.

In addition, the mounting tab 100 may have at least one unit shape that is folded upward once and downward once. When the cushion 200 is deployed, the folded portion 110 of the mounting tab is unfolded, and the point of the mounting tab folded upward is moved downward, such that the length of the mounting tab 100 is increased. Therefore, it is possible to adjust the increase or decrease in length of the mounting tab 100 by adjusting the number of times the unit shapes are repeated. Alternatively, it is also possible to adjust the increase or decrease in length of the mounting tab 100 by adjusting the length of the portion where the mounting tab 100 is folded upward and downward so that the portions of the mounting tab 100 overlap one another.

Meanwhile, a central portion of the mounting tab 100 in the assembled state may be temporarily fixed 120 so that the mounting tab 100 is fixed in the state in which the mounting tab 100 is folded in the upward/downward direction so that the portions of the mounting tab 100 overlap one another. When the cushion 200 is deployed, the temporarily fixed portion 120 is fractured, such that the folded portion 110 is unfolded.

The temporarily fixed portion 120 may maintain the state in which the length of the mounting tab 100 in the assembled state is decreased. The temporarily fixed portion 120 may be easily fractured when the cushion 200 is deployed. Therefore, when the cushion 200 is deployed, the folded portion 110 of the mounting tab is unfolded, such that the length of the mounting tab may be increased. To this end, the temporarily fixed portion 120 may appropriately be sewn by yarn with low tension or attached by a bonding agent with low bonding force so that the temporarily fixed portion 120 may be easily fractured.

Meanwhile, it is possible to maintain the state in which the length of the mounting tab 100 is decreased as the mounting tab 100 is folded in the assembled state at the point at which the mounting tab 100 and the tab strap 300 are coupled, without using the temporarily fixed portion 120. However, the temporarily fixed portion 120 may maintain the state in which the mounting tab 100 is folded in the assembled state regardless of the coupling point. Therefore, the point at which the mounting tab 100, the cushion 200, and the tab strap 300 are coupled may be changed in accordance with the necessity such as the convenience of processes or a reduction in costs.

Meanwhile, the mounting tab 100 may have a fixing hole 130 formed through the upper end of the mounting tab 100. The mounting tab 100 may be mounted on the vehicle body through the fixing hole 130. The formed fixing hole 130 makes it possible to fix the cushion 200 to the vehicle body without a separate component for coupling the cushion 200 to the vehicle body.

FIG. 4 is a view illustrating the tab strap coupled to the mounting tab of the curtain airbag apparatus for a vehicle according to the embodiment of the present disclosure. The curtain airbag apparatus for a vehicle according to the present disclosure includes the tab strap 300 having one end coupled to the mounting tab 100, and the other end coupled to the mounting tab in the state in which the tab strap 300 surrounds the folded cushion 200. The tab strap 300 in the assembled state may maintain the cushion 200 in the folded state and support a load of the cushion 200. When the cushion 200 is deployed, the tab strap 300, which surrounds the cushion, is loosened, and the folded cushion 200 moves downward while being unfolded.

In this case, one end of the tab strap 300 may be coupled to the lower end of the mounting tab 100, and the other end of the tab strap 300 may be fixed to the upper end of the mounting tab 100 in the state in which the tab strap 300 surrounds the folded cushion. The state in which the tab strap 300 surrounds the folded cushion 200 may be maintained in case that the tab strap 300 is fixed to the upper end of the mounting tab 100. When the cushion 200 is deployed, the tab strap 300 is unfixed, such that the cushion 200 is moved downward while being unfolded.

Meanwhile, a cut-out region 330 may be formed at one end of the tab strap 300, and the mounting tab 100 may penetrate the cut-out region 330, such that one end of the tab strap 300 may be fixed to the mounting tab in the state in which the tab strap 300 surrounds the folded cushion 200. Because the mounting tab 100 penetrates the cut-out region 330 of the tab strap as described above, the tab strap 300 may be easily fixed to the mounting tab 100, and a separate component for fixing the tab strap 300 is not required.

In this case, the mounting tab 100 may have a protrusion 140 formed on a portion that adjoins the cut-out region 330 of the tab strap. One end of the tab strap 300 may be fixed to the mounting tab 100 as the cut-out region 330 is caught by the protrusion 140. Because the protrusion 140 is formed, the tab strap 300 is easily fixed, and the assembled state is conveniently maintained in case of installing the airbag in the vehicle body.

In addition, the cut-out region 330 formed in the tab strap may be fractured when the cushion 200 is deployed. Because the cut-out region 330 is fractured, the tab strap 300 may be automatically loosened only by deployment power of the cushion 200 without a separate process when the folded cushion 200 is deployed while inflated, such that the cushion 200 may be quickly deployed downward. In this case, in case that the protrusion 140 is formed on the mounting tab, the protrusion 140 applies a shearing force to the cut-out region 330, which makes it easy to fracture the cut-out region 330.

FIG. 5 is a view illustrating a state in which the cushion of the curtain airbag apparatus for a vehicle according to the embodiment of the present disclosure is deployed. The curtain airbag apparatus for a vehicle according to the present disclosure is installed in the assembled state at the upper end of the vehicle body. When a vehicle collision is detected, the folded cushion 200 is deployed downward while inflated, and the deployed cushion 200 is positioned between the window and the seat of the vehicle. The deployed cushion 200 protects the occupant's lateral side, particularly, the occupant's head in the event of a collision.

When the cushion is deployed, the upper end 210 of the cushion may be positioned above a headrest 10 of the seat of the vehicle, and the lower end 220 of the cushion may be positioned below the headrest 10 of the seat of the vehicle. When the length of the mounting tab 100 is increased, the position of the deployed cushion 200 is moved downward to the extent that the length of the mounting tab 100 is increased. Therefore, the area of the cushion 200 may be efficiently used to the extent that the cushion 200 is moved downward. In this case, the upper end 210 of the cushion, which is moved downward, is positioned above the headrest 10 of the seat of the vehicle, and the lower end 220 of the cushion is positioned below the headrest 10. Therefore, it is possible to maintain the natural function of the curtain airbag for protecting the head of the occupant seated in the seat.

Meanwhile, the mounting tab 100 and the tab strap 300 of the curtain airbag apparatus for a vehicle according to the present disclosure may constitute a fixing set, and a plurality of fixing sets may be disposed at the upper end 210 of the cushion and spaced apart from one another.

Because the plurality of mounting tabs 100 is spaced apart from one another and coupled to the single cushion 200, the load of the cushion 200 may be easily supported, and the cushion 200 may be more securely fixed to the vehicle body. In addition, it is possible to prevent a situation in which the cushion 200 cannot exhibit the function thereof because the cushion 200 is separated from the vehicle body while being deployed.

Further, because a plurality of tab straps 300 is provided, it is possible to disperse and eliminate the force applied to unfold the folded cushion 200. Because the state in which the cushion 200 is folded in the assembled state is maintained, the airbag may be conveniently installed in the vehicle, and the cushion 200 may be prevented from being unfolded and moved downward while the vehicle travels.

According to the airbag apparatus for a vehicle according to the present disclosure, the length of the mounting tab is increased when the cushion is deployed, and the cushion is positioned downward to the extent that the length of the mounting tab is increased. Therefore, in comparison with the curtain airbag for a vehicle in the related art, the upper end of the cushion is positioned away from the upper end of the vehicle body and close to the occupant's head. Therefore, it is possible to reduce a region that is positioned at the upper end of the vehicle body and does not protect the occupant.

Therefore, a wider region for protecting the occupant may be ensured when the cushion is mounted while maintaining an area in the related art. Further, an area required to protect the occupant may be ensured even though the area is reduced in comparison with the related art. Therefore, it is possible to reduce the costs of the cushion and also reduce the capacity of the inflator required to deploy the cushion because the area of the cushion is reduced.

While the specific embodiments of the present disclosure have been illustrated and described above, it will be obvious to those skilled in the art that the present disclosure may be variously modified and changed without departing from the technical spirit of the present disclosure defined in the appended claims.

What is claimed is:

1. A curtain airbag apparatus for a vehicle, the curtain airbag apparatus comprising:
   a mounting tab having an upper end adapted to be coupled to a vehicle body and extending downward, the mounting tab being folded in an upward/downward direction so that portions of the mounting tab overlap one another, and having a decreased vertical length in an assembled state;
   a cushion folded in the assembled state and coupled to a lower end of the mounting tab, the cushion being configured to move downward when inflated; and
   a tab strap extending to surround the folded cushion and having one end coupled to the mounting tab and another end fixed to the mounting tab,
   wherein when the cushion is deployed, a folded portion of the mounting tab is unfolded such that the mounting tab is extended and a position of the cushion is moved downward;
   wherein a cut-out region is formed at the one end of the tab strap, and the mounting tab penetrates the cut-out region, such that the one end of the tab strap is fixed to the mounting tab in a state in which the tab strap surrounds the folded cushion; and
   wherein the mounting tab has a protrusion formed on a portion that adjoins the cut-out region of the tab strap, and the one end of the tab strap is fixed to the mounting tab as the cut-out region is caught by the protrusion.

2. The curtain airbag apparatus of claim 1, wherein:
   a central portion of the mounting tab in the assembled state is temporarily fixed so that the mounting tab is in a state in which the mounting tab is folded so that the portions of the mounting tab overlap one another, and when the cushion is deployed, the temporarily fixed portion is fractured, and the folded portion is unfolded.

3. The curtain airbag apparatus of claim 1, wherein the mounting tab has at least one unit shape that is folded upward once and downward once.

4. The curtain airbag apparatus of claim 1, wherein the mounting tab has a fixing hole formed through the upper end thereof, and the mounting tab is mounted on the vehicle body through the fixing hole.

5. The curtain airbag apparatus of claim 1, wherein when the cushion is deployed, an upper end of the cushion is adapted to be positioned above a headrest of a seat of the vehicle, and a lower end of the cushion is adapted to be positioned below the headrest of the seat of the vehicle.

6. The curtain airbag apparatus of claim 1, wherein the one end of the tab strap is coupled to a lower end of the mounting tab, and the another end of the tab strap is fixed to an upper end of the mounting tab in a state in which the tab strap surrounds the folded cushion.

7. The curtain airbag apparatus of claim 1, wherein the cut-out region formed at the one end of the tab strap is fractured when the cushion is deployed so that the cushion, which is folded and surrounded by the tab strap, moves downward while inflated when deployed.

8. The curtain airbag apparatus of claim 1, wherein the mounting tab and the tab strap constitute a fixing set, and a plurality of fixing sets is disposed on an upper end of the cushion and spaced apart from one another.

9. The curtain airbag apparatus of claim 1, wherein the mounting tab, the cushion, and the tab strap are coupled together in a state in which portions of the mounting tab, which are respectively connected to the cushion and the tab strap, are aligned on a same line.

10. The curtain airbag apparatus of claim 1, wherein a lower end of the mounting tab, an upper end of the cushion, and the one end of the tab strap are coupled together at a same point.

\* \* \* \* \*